United States Patent [19]

Ueno

[11] Patent Number: 4,856,549

[45] Date of Patent: Aug. 15, 1989

[54] SHUTTLE VALVE DEVICE

[75] Inventor: Katsumi Ueno, Higashimatsuyama, Japan

[73] Assignee: Diesel Kiki Co., Ltd., Tokyo, Japan

[21] Appl. No.: 298,970

[22] Filed: Jan. 19, 1989

[30] Foreign Application Priority Data

Feb. 22, 1988 [JP] Japan .................................. 63-37419

[51] Int. Cl.⁴ .............................................. F16K 11/10
[52] U.S. Cl. ..................................... 137/112; 137/512
[58] Field of Search ................. 137/112, 113, 111, 512

[56] References Cited

U.S. PATENT DOCUMENTS

| | | | |
|---|---|---|---|
| 2,778,316 | 1/1957 | Haight | 137/112 X |
| 3,447,556 | 6/1989 | Horweth | 137/112 |
| 4,249,557 | 2/1981 | Habiger | 137/112 |
| 4,438,778 | 3/1984 | Spencer | 137/112 |

FOREIGN PATENT DOCUMENTS 54-115421  9/1979  Japan .
61-36568   2/1986  Japan .
61-233273 10/1986  Japan .

*Primary Examiner*—Alan Cohan
*Attorney, Agent, or Firm*—Wegner & Bretschneider

[57] ABSTRACT

In a shuttle valve device, a device body is formed by a single block in order to simplify construction. The device body is formed with a communication passage extending straight. A plurality of fitting bores are intersected with the communication passage. Each fitting bore extends straight from an outer surface of the block toward the communication passage. The fitting bore is intersected with the communication passage and has a forward end portion extending beyond the communication passage. The forward end portion serves as a pressure introducing section. Shuttle valves are inserted respectively in the fitting bores so as to divide the communication passage into a plurality of sections. Each shuttle valve compares pressure introduced through the passage section on one side of the shuttle valve with pressure introduced through the forward end portion of the fitting bore, to select one of the pressures and to lead the selected pressure to the passage section on the other side of the shuttle valve.

4 Claims, 1 Drawing Sheet

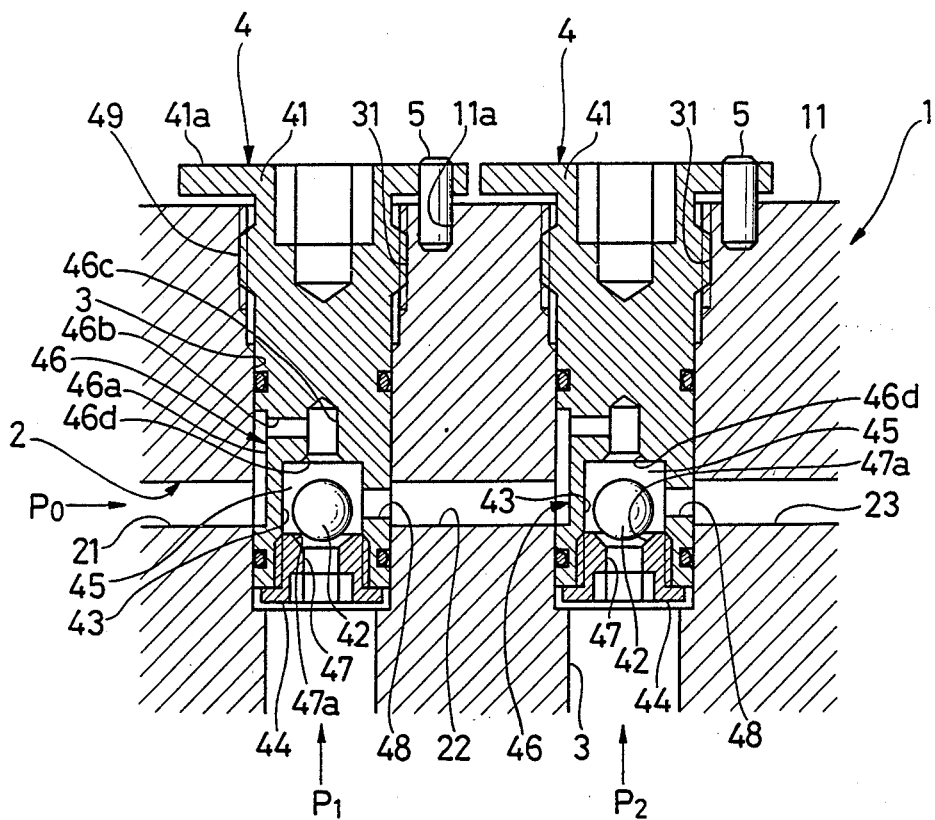

SHUTTLE VALVE DEVICE

BACKGROUND OF THE INVENTION

The present invention relates to a shuttle valve device for selecting one of a plurality of hydraulic pressures, for example, the highest pressure.

A shuttle valve device is known from Japanese Patent Application Laid-Open Nos. 54-115421, 61-36568 and 61-233273. The known shuttle valve device comprises a device body which is composed of a plurality of blocks connected to each other in a stacked fashion. A plurality of shuttle valves are arranged respectively within accommodating spaces formed respectively in the blocks. The shuttle valves communicate with each other through passages formed respectively in the blocks or through passages formed respectively between the adjacent blocks.

The above-described conventional shuttle valve device has the following drawbacks. That is, since the plurality of blocks are required, the number of component parts increases. In addition, since a multiplicity of passages are required, the device is complicated in construction. Thus, the manufacturing cost is high.

Further FIG. 16 of the above-mentioned Japanese Patent Application Laid-Open No. 61-36568 shows, as the prior art, a shuttle valve device in which a multiplicity of shuttle valves are incorporated in a device body formed by a single block. However, the shuttle valve device is extremely complicated in arrangement of passages through which the shuttle valves communicate with each other.

SUMMARY OF THE INVENTION

It is an object of the invention to provide a shuttle valve device which is simple in construction and can be manufactured at low cost.

According to the invention, there is provided a shuttle valve device comprising:

(a) a device body formed by a single block, the device body having a communication passage extending straight and a plurality of fitting bores, each fitting bore extending straight from an outer surface of the block toward the communication passage and being intersected with the same, the fitting bore having a forward end portion extending beyond the communication passage, the forward end portion of the fitting bore serving as a pressure introducing section: and (b) a plurality of shuttle valves inserted respectively in the fitting bores in the device body so as to divide the communication passage into a plurality of passage sections, the arrangement being such that each of the shuttle valves compares pressure introduced through one of the passage sections located on one side of the shuttle valve with pressure introduced through the forward end portion of a corresponding one of the fitting bores, to select one of the pressures thereby leading the selected pressure to one of the passage sections located on the other side of the shuttle valve.

BRIEF DESCRIPTION OF THE DRAWING

Single FIGURE is a fragmentary cross-sectional view of a shuttle valve device according to an embodiment of the invention.

DETAILED DESCRIPTION

Referring to FIGURE, there is shown a shuttle valve device according to a embodiment of the invention, which comprises a device body 1 formed by a single block. The device body 1 is in the form of, for example, a rectangular parallelepiped having six planar outer side faces whose one is shown and designated by the reference numeral 11. The device body 1 is formed therein with a communication passage 2 which extends straight in parallel relation to the planar side face 11. The communication passage 2 has its opposite ends which open respectively at two planar side faces (not shown) extending parallel to each other and perpendicularly to the planar side face 11. The left-hand open end of the communication passage 2 serves as a pressure introducing port from the outside, while the right-hand open end serves as a pressure takeout port to the outside.

The device body 1 is further formed therein with a plurality of fitting bores 3 arranged in parallel relation to each other. Each fitting bore 3 has an axis extending perpendicularly to the planar side face 11 of the device body 1 and to the communication passage 2 therein. Specifically, each fitting bore 3 has an upper end opening at the planar side face 11. The fitting bore 3 is intersected with the communication bore 2, and extends beyond the intersection downwardly as viewed in FIGURE. A lower end of the fitting bore 3 opens at a lower planar side face (not shown) of the device body 1 and serves as a pressure introducing port from the outside.

A plurality of shuttle valves 4 are inserted respectively in the fitting bores 3 from their respective upper open ends. Each shuttle valve 4 has a valve body 41 and a valve member 42 in the form of a ball. The valve body 41 has a rod-like shape and is inserted in the fitting bore 3 in such a manner that male threads 49 formed on the outer periphery of the valve body 41 are threadedly engaged with female threads 31 formed on the peripheral wall surface of the fitting bore 3. The valve body 41 is provided at its upper end with a flange 41a, and is positioned by a knock pin 5 which extends through the flange 41a and which is fitted in a bore 11a formed in the planar side face 11 of the device body 1.

Parts of the respective valve bodies 41 occupy the intersections between the respective fitting bores 3 and the communication passage 2, so that the communication passage 2 is divided into a plurality of passage sections, for example, three passage sections 21, 22 and 23 in case of the illustrated embodiment. The left-hand end of the passage section 21 serves as the pressure introducing port, while the right-hand end of the passage section 22 serves as the pressure takeout port.

The valve body 41 of each shuttle valve 4 has a lower end face formed with a bore 43 whose axis coincides with the axis of the valve body 41. A male-threaded member 44 forming a part of the valve body 41 is threadedly engaged with an open end of the bore 43 in a fixed manner. The male-threaded member 44 has an upper end face which cooperates with the wall surface of the bore 43 to define a valve chamber 45.

The valve body 41 is formed with three, i.e., first, second and third ports 46, 47 and 48. These ports 46, 47 and 48 will be described with reference to the shuttle valve 4 located on the left as viewed in FIGURE, as an example.

The above-mentioned first port 46 is composed of a longitudinal groove 46a, a lateral bore 46b and a longitudinal bore 46c. The longitudinal groove 46a is formed in the peripheral surface of the valve body 41 and extends parallel to the axis thereof. The longitudinal groove 46a has a lower end connected to the right-hand end of the passage section 21. The lateral bore 46b extends perpendicularly to the axis of the valve body 41. The lateral bore 46b has a left-hand end connected to the upper end of the longitudinal groove 46a. A right-hand end of the lateral bore 46b reaches the axis of the valve body 41. The longitudinal bore 46c is so formed as to have an axis coinciding with the axis of the valve body 41. An upper end of the longitudinal bore 46c is connected to the right-hand end of the lateral bore 46b, while a lower end of the longitudinal bore 46c opens at the upper surface of the bore 43 in facing relation to the valve chamber 45. The lower open end of the longitudinal bore 46c has a peripheral edge which is formed into a first valve seat 46d.

The aforementioned second port 47 is formed through the male-threaded member 44 and extends such that an axis of the second port 47 coincides with the axis of the male threaded member 44. The second port 47 has an open end facing to the valve chamber 45. The open end of the second port 47 has a peripheral edge formed into a second valve seat 47a.

The third port 48 is located on the right of the valve chamber 45 and has an axis coinciding with the axis of the communication passage 2. The third port 48 has a left-hand end which opens at the peripheral wall surface of the bore 43 and which faces to the valve chamber 45. A right-hand end of the third port 48 opens at the outer peripheral surface of the valve body 41 and faces to the passage section 22. The valve chamber 45 always communicates with the passage section 22 through the third port 48.

The valve member 42 is accommodated in the valve chamber 45 for movement axially of the valve body 41. When the pressure at the first port 46 is higher than that at the second port 47 the valve member 42 is seated on the second valve seat 47a. On the other hand, when the pressure at the second port 47 is higher than that at the first port 46, the valve member 42 is seated on the first valve seat 46d. In this manner, the shuttle valve 4 can select higher one of the pressures at the respective ports 46 and 47 such that the selected pressure is introduced into the valve chamber 45.

The arrangement described above with reference to the left-hand shuttle valve 4 is the same as that of the right-hand shuttle valve 4. Accordingly, the same components and parts of the right-hand shuttle valve 4 as those of the left-hand shuttle valve 4 are designated by the same reference numerals, and the description of the same components and parts will therefore be omitted. In this connection, in the right-hand shuttle valve 4, the first port 46 is connected to the passage section 22, while the third port 48 is connected to the passage section 23.

In the shuttle valve device constructed as above, pressure $P_0$ of fluid such as oil or the like from the passage section 21 is applied to the first port 46 of the left-hand shuttle valve 4, and pressure $P_1$ from the lower end of the fitting bore 3 is applied to the second port 47. Furthermore pressure $P_2$ from the lower end of another fitting bore 3 is applied to the second port 47 of the right-hand shuttle valve 4.

The operation of the two shuttle valves 4 and 4 will next be described on the assumption that the respective pressures have the relation of $P_0 < P_1 < P_2$. Since the relation of $P_0 < P_1$ exists in the left-hand shuttle valve 4, the valve member 42 is moved away from the second valve seat 47a and is seated on the first valve seat 46d. Thus, the pressure $P_1$ is introduced into the valve chamber 45 through the second port 47 and is applied to the passage section 22 through the third port 48. On the other hand, since, in the right-hand shuttle valve 4, the pressure $P_2$ applied to the second port 47 is higher than the pressure $P_1$ applied to the first port 48 from the passage section 22, the valve member 42 is seated on the first valve seat 46d. Thus, the pressure $P_2$ is applied to the passage section 23 through the second port 47 the valve chamber 45 and the third port 48. In this manner, the highest one of the pressures introduced, is selected, and is supplied to the pressure takeout port at the right-hand end of the passage section 23.

As described above, the arrangement of the shuttle valve device according to the invention is such that the plurality of shuttle valves are operatively connected to each other through the single communication passage 2 extending straight, with such arrangement, it is possible to eliminate the necessity of employing a multiplicity of blocks or plates. Moreover, the passage arrangement or construction is simplified extremely. Thus, the manufacturing cost can be restrained low.

It is to be understood that the invention is not limited to the above-described specific embodiment, but various changes and modifications can be made to the invention as described below.

In the above embodiment, two shuttle valves are incorporated in the device body. However, three or more shuttle valves may be incorporated in the device body.

Further, each shuttle valve of the above embodiment employs the valve member in the form of a ball, but any other suitable valve member such as, for example, flat-type valve member may be used.

At least one of the opposite ends of the communication passage may be closed by a plug. In this case, at least one of a pressure introducing port and a pressure takeout port may be formed in the device body such that the at least one port communicates with the communication passage in intersected relation thereto at a location adjacent the plug. Furthermore, the communication passage may not extend through the device body, but at least one of the opposite ends of the communication passage may be terminated in short of the outer surface of the device body.

The lower open end of each fitting bore may be closed by a plug. Alternatively each fitting bore may be a blind bore whose lower end or bottom is located in short of the lower planar side face of the device body. In these cases, a pressure introducing port may be formed in the device body such that the pressure introducing port communicates with the lower end of the fitting bore in intersected relation thereto.

Furthermore in the shuttle valve device according to the invention, any suitable valves may be incorporated in the block forming the device body in addition to the shuttle valves. In this case, a first one of the additional valves is provided in association with one of the sections of the communication passage at one end thereof. A second one of the additional valves is provided in association with the section of the communication passage at the other end thereof. The remaining additional valves are provided in association respectively with the forward end portions of the respective fitting bores. Pressure from the first additional valve is applied to the first port of the shuttle valve adjacent the first additional valve. through the passage section at the one end. Pressures from the remaining respective additional valves are applied respectively to the second ports of the shuttle valves. Highest one of the pressures is selected in a manner similar to that described previously. The selected highest pressure is led from the third port of the shuttle valve adjacent the second additional valve and is supplied to the second additional valve.

What is claimed is:

1. A shuttle valve device comprising:
   (a) a device body formed by a single block, said device body having a communication passage extending straight and a plurality of fitting bores, each fitting bore extending straight from an outer surface of said block toward said communication passage and being intersected with the same, the fitting bore having a forward end portion extending beyond said communication passage, the forward end portion of the fitting bore serving as a pressure introducing section; and
   (b) a plurality of shuttle valves inserted respectively in said fitting bores in said device body so as to divide said communication passage into a plurality of passage sections, the arrangement being such that each of said shuttle valves compares pressure introduced through one of said passage sections located on one side of the shuttle valve with pressure introduced through the forward end portion of a corresponding one of said fitting bores, to select one of the pressures thereby leading the selected pressure to one of said passage sections located on the other side of the shuttle valve.

2. A shuttle valve device according to claim 1, wherein said fitting bores extend perpendicularly to said communication passage and are so formed as to be arranged in parallel relation to each other.

3. A shuttle valve device according to claim 2, wherein each of said shuttle valves includes a valve body and a valve member, the valve body being fitted in a corresponding one of said fitting bores, the valve body being formed therein with a valve chamber, the valve body having a pair of first and second valve seats formed in a surface defining the valve chamber the first and second valve seats facing toward each other along an axis of the valve body, the valve body being further formed with first second and third ports, one of said passage sections on one side of the shuttle valve communicating with the first valve seat through the first port, the forward end portion of the fitting bore communicating with the second valve seal through the second port, one of said passage sections on the other side of the shuttle valve communicating with the valve chamber through the third port, the valve member being accommodated in the valve chamber, the valve member being spaced away from one of the first and second valve seats communicating with one of the first and second ports at which pressure is higher than that at the other port, so that the valve member is seated on the other valve seat, to thereby select the higher pressure, the selected pressure being supplied to the passage section on the other side of the shuttle valve through the valve chamber and the third port.

4. A shuttle valve device according to claim 3, wherein the first port of each of said shuttle valves is provided with a longitudinal groove formed in a peripheral surface of the valve body of the shuttle valve and extending parallel to an axis of the valve body, the longitudinal groove having on end connected to the passage section on the one side of the shuttle valve, a lateral bore having one end connected to the other end of the longitudinal groove, the other end of the lateral bore reaching the ax!s of the valve body, and a longitudinal bore extending such that an axis of the longitudinal bore coincides with the axis of the valve body, the longitudinal bore having one end connected to the other end of the lateral bore, the other end of the longitudinal bore opening to the valve chamber, the other open end of the longitudinal bore having a peripheral edge formed into the first valve seat of the shuttle valve.

* * * * *